United States Patent
Wu

(10) Patent No.: US 6,412,606 B1
(45) Date of Patent: Jul. 2, 2002

(54) DAMPER/POSITIONING STRUCTURE

(76) Inventor: Chun-Liang Wu, No. 31-4, Kou Min Street, TaoYuan City (TW)

( * ) Notice: Subject to any disclaimer, the term of this patent is extended or adjusted under 35 U.S.C. 154(b) by 0 days.

(21) Appl. No.: 09/968,964

(22) Filed: Oct. 3, 2001

(51) Int. Cl.7 ............................................. F16D 63/00
(52) U.S. Cl. .................. 188/68; 188/266; 188/271; 188/281; 188/381; 267/205; 267/293
(58) Field of Search ................... 267/195, 196, 267/201, 205, 206, 207, 209, 210, 213, 214, 216, 29.1, 293, 134; 188/67, 68, 378, 266, 271, 281, 381

(56) References Cited

U.S. PATENT DOCUMENTS

| | | | |
|---|---|---|---|
| 4,030,579 A | * 6/1977 | Sell | 188/165 |
| 4,093,042 A | * 6/1978 | Pradon | 188/189 |
| 4,094,387 A | * 6/1978 | Pelat et al. | 188/381 |
| 4,291,416 A | * 9/1981 | Hoeptner, III | 188/67 |
| 4,457,741 A | * 7/1984 | Hoeptner, III | 188/67 |
| 4,545,322 A | * 10/1985 | Yang | 16/85 |
| 4,577,732 A | * 3/1986 | Gottling | 188/265 |
| 4,957,313 A | * 9/1990 | MacIntyre et al. | 188/67 |
| 4,962,674 A | * 10/1990 | Payne | 187/267 |
| 5,115,889 A | * 5/1992 | Fortmann et al. | 188/67 |
| 5,689,995 A | * 11/1997 | Heckel, Jr. | 188/67 |
| 5,871,235 A | * 2/1999 | Wier | 188/67 |
| 5,988,342 A | * 11/1999 | Ito et al. | 188/67 |
| 6,325,322 B1 | * 12/2001 | Wu | 188/381 |

* cited by examiner

Primary Examiner—Jack Lavinder
Assistant Examiner—Devon Kramer
(74) Attorney, Agent, or Firm—Rosenberg, Klein & Lee

(57) ABSTRACT

A damper includes a barrel axially slidably mounted on a shaft, an elastic ring mounted inside the barrel around the shaft, arched pressure blocks mounted abutted against one another inside the elastic ring around the shaft, each arched pressure block having an axially extended sloping groove, steel balls respectively arranged in the sloping groove of each arched pressure block in contact with the periphery of the shaft, a rigid locating ring mounted inside the barrel to support the steel balls in the sloping groove of each arched pressure block, a screw cap threaded into one side of the barrel, a compression spring stopped between the screw cap and the locating ring, a hollow adjustment screw member threaded into one side of the barrel to support the steel balls in the sloping groove of each arched pressure block against the locating ring.

5 Claims, 6 Drawing Sheets

DAMPER/POSITIONING STRUCTURE

BACKGROUND OF THE INVENTION

1. Field of the Invention

The present invention relates to a damper and, more particularly, to such a damper that enables the user to adjust the damping force accurately.

2. Description of the Prior Art

In a regular oil damping device, a piston is moved in a cylinder to squeeze a fluid (oil) out of an oil hole or valve. The fluid buffers the moving speed of the piston. This structure of oil damping device cannot eliminate oil leakage after a long sue. FIG. 1 shows a damper that eliminates the use of a fluid. This structure of damper comprises a cylinder 12, the cylinder 12 having a cylinder chamber 12c, , and two end holes 12d in two end walls thereof, a stop rod 16 axially slidably inserted through the end holes 12d of the cylinder 12, the stop rod having an outer thread 16c, a nut 14 disposed inside the cylinder 12 and threaded onto the outer thread 16c of the stop rod 16, a steel ball 182, a compression spring 181 mounted in a side hole of the cylinder 18 and pressed on the steel ball 182 against the nut 14, and an adjustment screw 18 threaded into the side hole of the cylinder 18 and stopped at the compression spring 181 against the steel ball 182. This structure of damper is not easy to assemble. Further, because the friction force between the nut 14 and the stop rod 16 is high, the user cannot accurately adjust the damping force of this structure of damper.

SUMMARY OF THE INVENTION

The present invention has been accomplished under the circumstances in view. It is one object of the present invention to provide a damper, which enables the user to adjust the damping force accurately. It is another object of the present invention to provide a damper, which is easy to assemble. It is still another object of the present invention to provide a damper, which can be used as a positioning structure. According to one aspect of the present invention, the damper comprises a barrel axially slidably mounted on a shaft, an elastic ring mounted inside the barrel around the shaft, arched pressure blocks mounted abutted against one another inside the elastic ring around the shaft, each arched pressure block having an axially extended sloping groove, steel balls respectively arranged in the sloping groove of each arched pressure block in contact with the periphery of the shaft, a rigid locating ring mounted inside the barrel to support the steel balls in the sloping groove of each arched pressure block, a screw cap threaded into one side of the barrel, a compression spring stopped between the screw cap and the locating ring, a hollow adjustment screw member threaded into one side of the barrel to support the steel balls in the sloping groove of each arched pressure block against the locating ring. According to another aspect of the present invention, a return spring is provided between the shaft and the adjustment screw member for quick return of the barrel.

DETAILED DESCRIPTION OF THE PREFERRED EMBODIMENT

Figure 1:
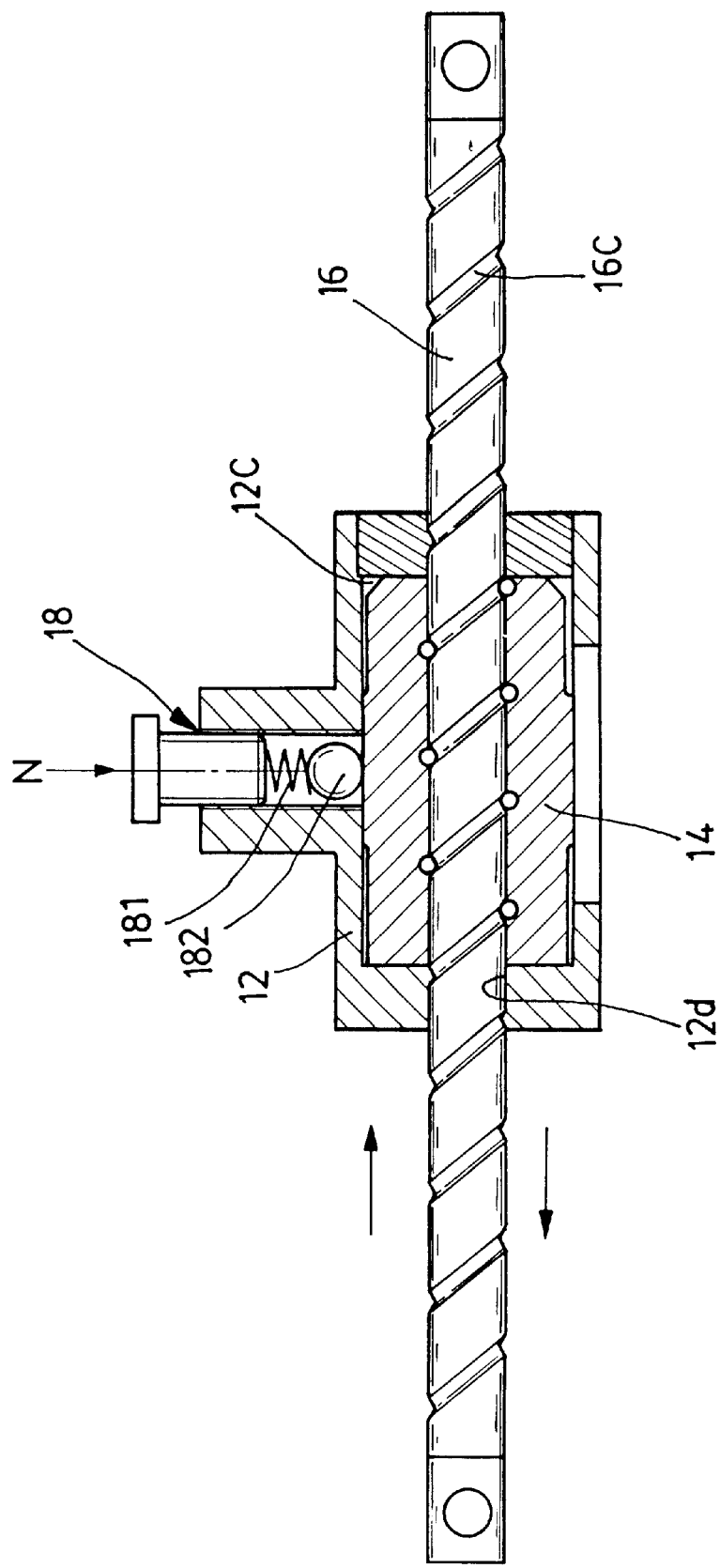
FIG. 1 is a sectional view of a damper according to the prior art.
Figure 2:
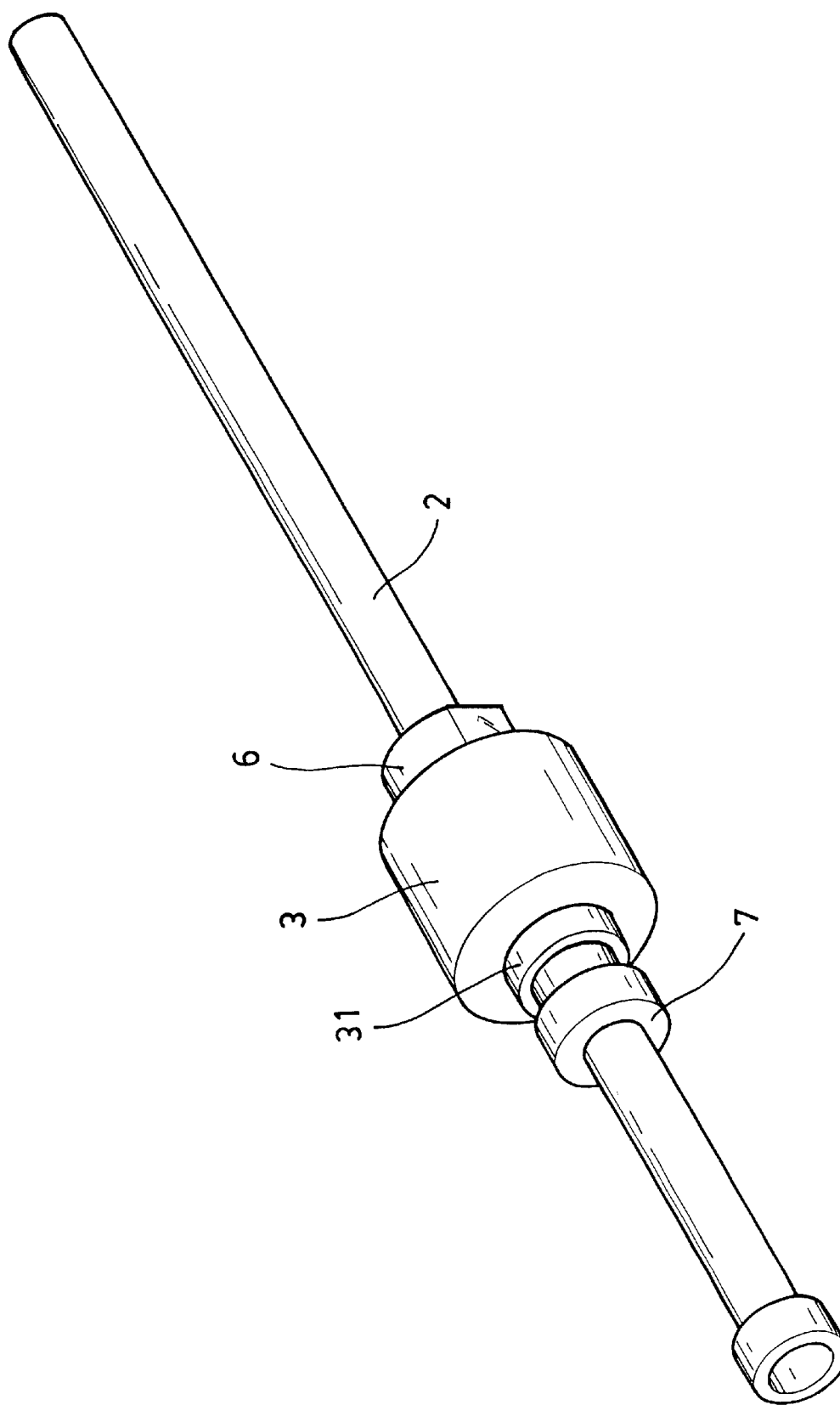
FIG. 2 is an elevational view of a damper constructed according to one embodiment of the present invention.
Figure 3:
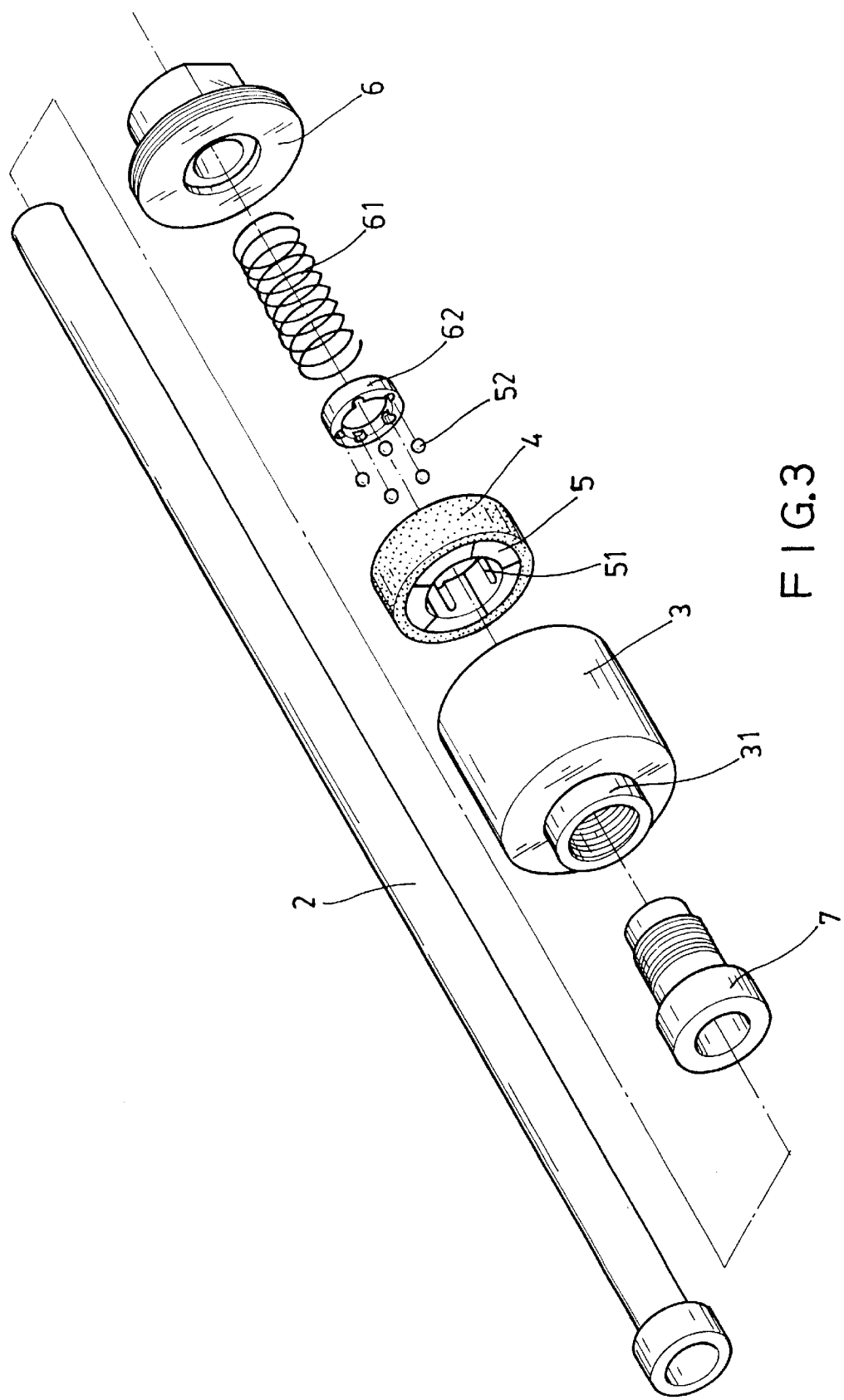
FIG. 3 is an exploded view of the damper shown in FIG. 2.
Figure 4:
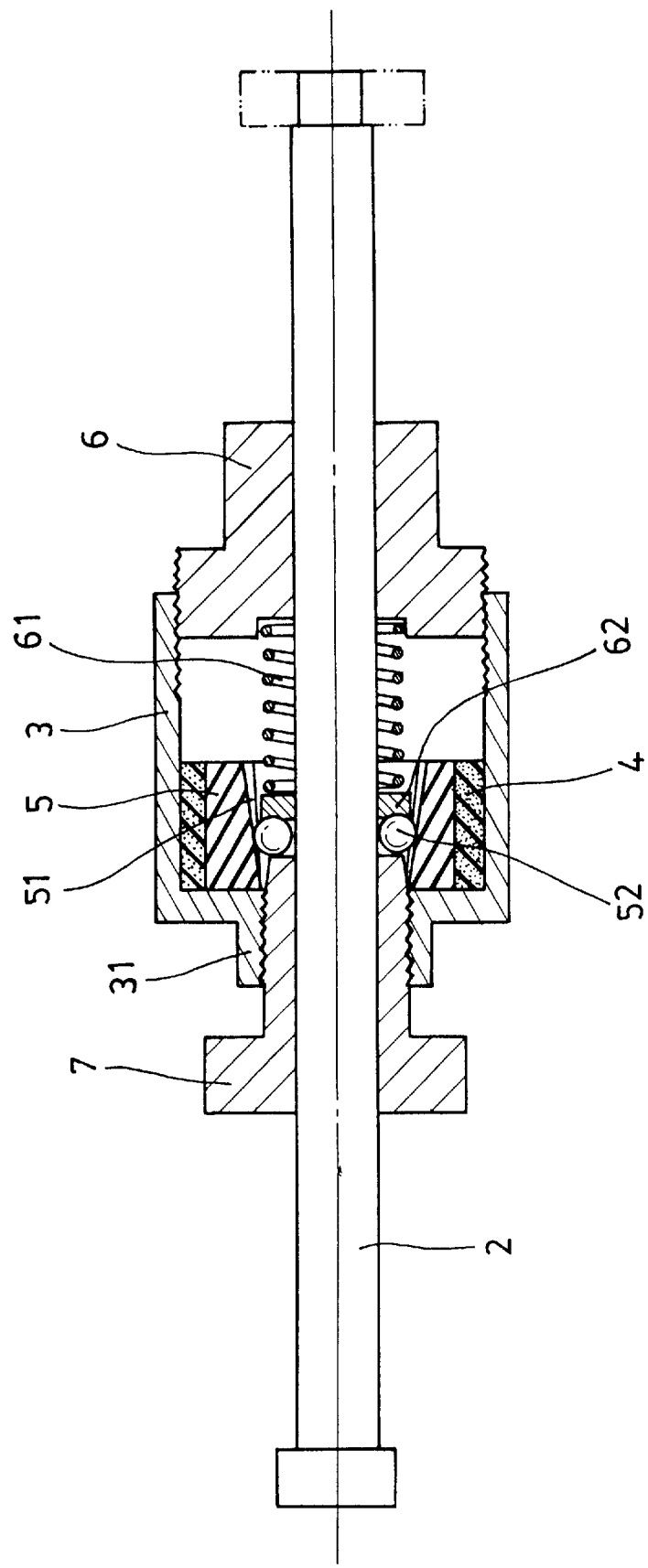
FIG. 4 is a longitudinal view in section of the damper shown in FIG. 2.

Referring to FIGS. 2~4, a damper is shown comprising:

a shaft 2;

a barrel 3 sleeved onto the shaft 2 and moved axially along the shaft 2, the barrel 3 having a neck 31 at its one end;

an elastic ring 4 fitted into the inside of the barrel 3 around the shaft 2;

a plurality of arched pressure blocks 5 mounted inside the elastic ring 4 and abutted against one another around the shaft 2, the arched pressure blocks 5 each having an axially extended sloping groove 51 of depth gradually reduced from an outer side (the side remote from the neck 31 of the barrel 3) toward an inner side (the side adjacent to the neck 31 of the barrel 3);

a plurality of steel balls 52 respectively arranged in the sloping groove 51 of each arched pressure block 5 in contact with the periphery of the shaft 2;

a rigid locating ring 62 mounted around the shaft 2 inside the barrel 3 to hold the steel balls 52 in the sloping groove 51 of each arched pressure block 5;

a screw cap 6 threaded into the barrel 3 around the shaft 2;

a compression spring 61 mounted around the shaft 2 inside the barrel 3 and stopped between the screw cap 6 and the locating ring 62; and a hollow adjustment screw member 7 sleeved onto the shaft 2 and threaded into the neck 31 of the barrel 3 to support the steel balls 52 in the sloping groove 51 of each arched pressure block 5 against the locating ring 62 and the spring power of the compression spring 61.

The friction resistance between the steel balls 52 and the periphery of the shaft 2 varies with the position of the steel balls 52 in the sloping groove 51 of each of the arched pressure blocks 5. When moving the barrel 3 rightwards along the shaft 2 to the position shown in FIG. 4, the arched pressure blocks 5 are forced radially outwards by the steel balls 52 to expand the elastic ring 4 against the inside wall of the barrel 3, producing a damping force. By means of rotating the hollow adjustment screw member 7 to adjust the position of the steel balls 52 in the sloping groove 51 of each of the arched pressure blocks 5, the damping force is relatively adjusted. On the contrary, when moving the barrel 3 leftwards along the shaft 2, the steel balls 52 are released, and the damping force is disappeared. The damper of the present invention is a one-way lightweight design applicable to substitute for regular hydraulic, pneumatic dampers, preventing the problem of oil/air leakage.

Figure 5:
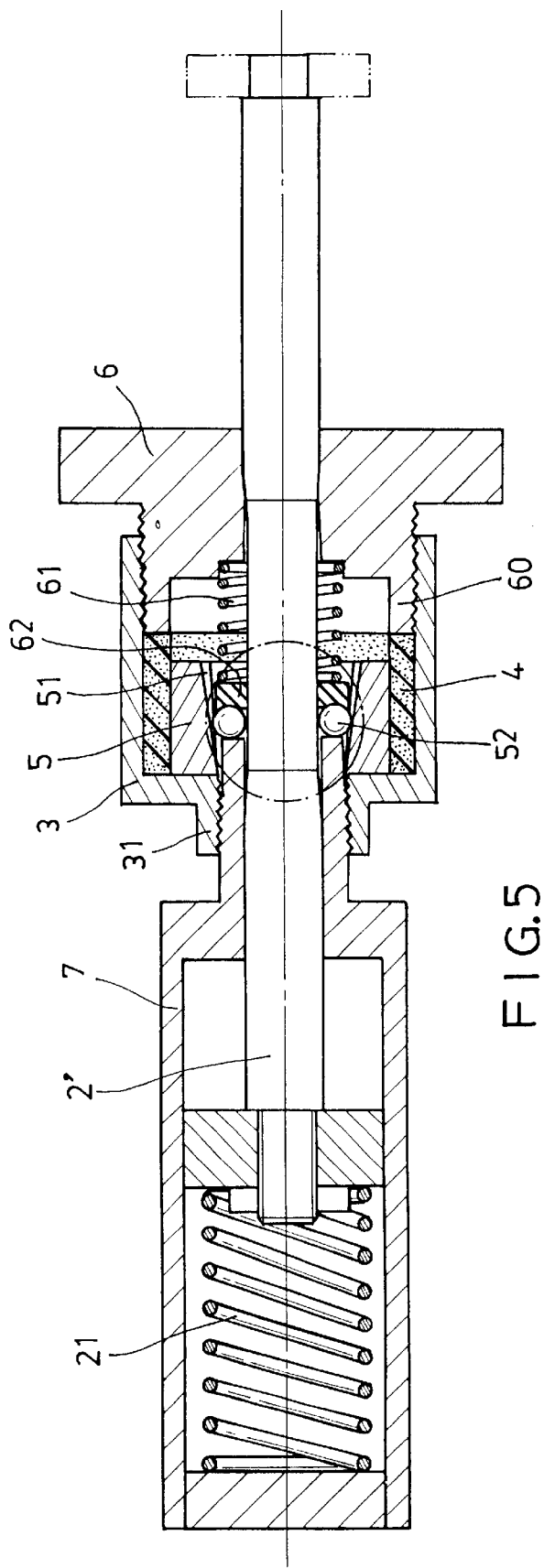
FIG. 5 is a sectional view of an alternate form of the damper according to the present invention.

FIG. 5 shows an alternate form of the present invention. According to this alternate form, a return spring 21 is provided between the shaft 2' and the hollow adjustment screw member 7 and adapted to return the barrel 3 to its initial position rapidly after each damping cycle.

Figure 6:
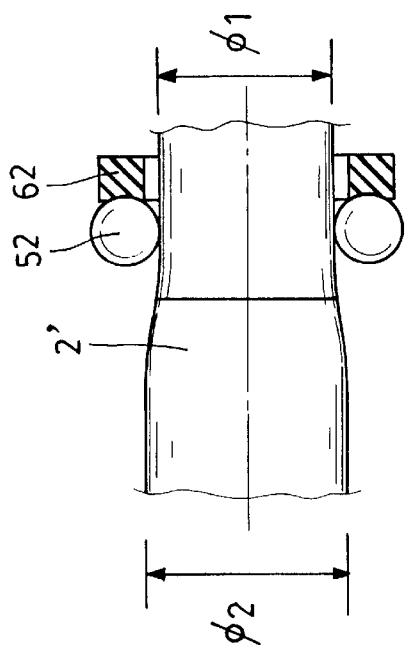
FIG. 6 is an enlarged view of a part of FIG. 5.

Referring to FIG. 6 and FIG. 5 again, the shaft 2' is made having sections of different outer diameters $\phi 1$ and $\phi 2$ adapted to produce different friction resistance with the steel balls 52. The connecting area between each two sections of different outer diameters is tapered.

Referring to FIGS. 4 and 5 again, the adjustment of the damping force can alternatively be achieved by rotating the screw cap 6 inwards/outwards relative to the barrel 3 or changing the spring power of the compression spring 61.

Referring to FIG. 5 again, the elastic ring 4 is stopped against the inner side 60 of the screw cap 6. When rotating the screw cap 6 inwards/outwards relative to the barrel 3, the spring power of the elastic ring 4 is relatively adjusted. When rotating the screw cap 6 inwards to compress the elastic ring 4 axially, the radial expansion power of the elastic ring 4 is relatively reduced. On the contrary, the radial expansion power of the elastic ring 4 is relatively increased when rotating the screw cap 6 outwards from the elastic ring 4. Therefore, the damping force can be accurately adjusted by means of controlling the position of the screw cap 6 in the barrel 3.

Figure 7:
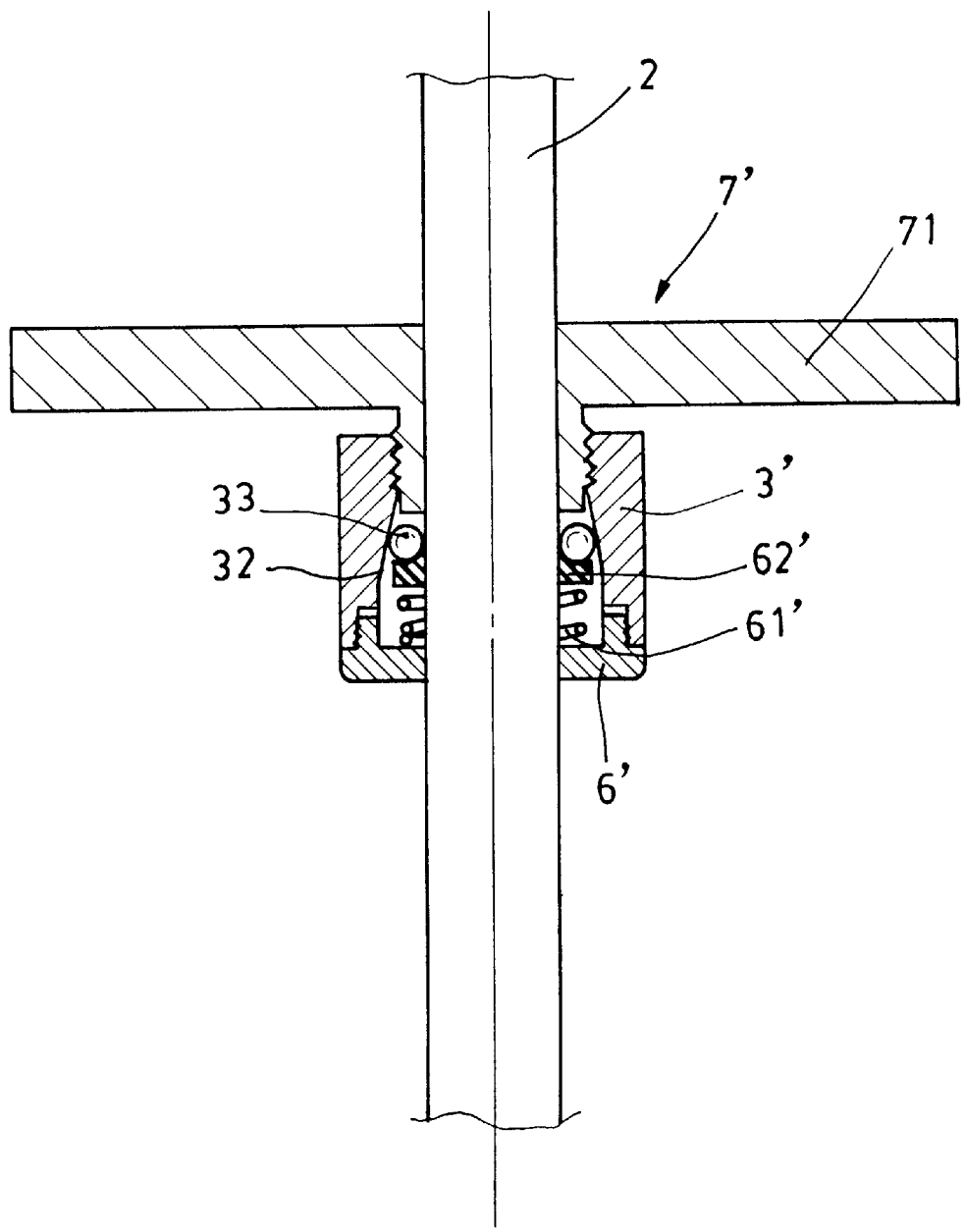
FIG. 7 is a sectional view of a positioning structure constructed according to the present invention.

When the damping force reached the maximum value, the steel balls 52 are firmly secured in position in the sloping groove 51 of each of the arched pressure blocks 5, stopping the shaft 2 and the barrel 3 from relative motion, and the damper works as a positioning structure at this time. In this case, the elastic ring 4 and the arched pressure blocks 5 can be eliminated. As illustrated in FIG. 7, the positioning structure is mounted on a shaft 2, comprising a barrel 3', the barrel 3' having a tapered inner diameter 32, a plurality of steel balls 33 mounted inside the tapered inner diameter 32 of the barrel 3' in contact with the periphery of the shaft 2, a screw cap 6' threaded into one end of the barrel 3', a rigid locating ring 62' axially movably mounted inside the barrel 3' around the shaft 2 and holding the steel balls 33 in contact with the periphery of the shaft 2, a compression spring 61' mounted around the shaft 2 and stopped between the screw cap 6' and the locating ring 62', and an adjustment screw member 7' threaded into the other end of the barrel 3' and adapted to adjust the position of the steel balls 33 in the tapered inner diameter 32 of the barrel 3'. The adjustment screw member 7' has an outwardly extended head 71 for positioning to limit the direction of movement of the barrel 3', enabling the positioning structure to be used in a retractable rack.

The aforesaid damper or positioning structure is a one-way design. Two dampers/positioning structures may be arranged in reversed directions to achieve a two-way damping effect.

A prototype of damper/positioning structure has been constructed with the features of the annexed drawings of FIGS. 2~7. The damper/positioning structure functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A damper comprising:

a shaft;

a barrel axially slidably mounted on said shaft, said barrel having a neck at one end thereof;

an elastic ring mounted inside said barrel around said shaft;

a plurality of arched pressure blocks mounted inside said elastic ring and abutted against one another around said shaft, said arched pressure blocks each having an axially extended sloping groove of depth gradually reduced from an outer side remote from the neck of said barrel toward an inner side adjacent to the neck of said barrel;

a plurality of steel balls respectively arranged in the sloping groove of each of said arched pressure blocks in contact with the periphery of said shaft;

a rigid locating ring mounted around said shaft inside said barrel to support said steel balls in the sloping groove of each of said arched pressure blocks;

a screw cap threaded into one side of said barrel around said shaft remote from the neck of said barrel;

a compression spring mounted around said shaft inside said barrel and stopped between said screw cap and said locating ring; and a hollow adjustment screw member sleeved onto said shaft and threaded into said neck of said barrel to support said steel balls in the sloping groove of each of said arched pressure blocks against said locating ring and the spring power of said compression spring.

2. The damper as claimed in claim 1 further comprising a return spring connected between said shaft and said adjustment screw member.

3. The damper as claimed in claim 1 wherein said shaft has sections of different outer diameters and a tapered periphery between each two sections of different outer diameters.

4. A positioning structure comprising:

a shaft;

a barrel axially slidably mounted around said shaft, said barrel having a tapered inner diameter;

a plurality of steel balls mounted inside the tapered inner diameter of said barrel and disposed in contact with the periphery of said shaft;

a screw cap threaded into one end of said barrel;

a rigid locating ring axially movably mounted inside said barrel around said shaft and holding said steel balls in contact with the periphery of said shaft;

a compression spring mounted around said shaft and stopped between said screw cap and said locating ring; and an adjustment screw member threaded into an opposite end of said barrel and stopped at said steel balls against said locating ring and adapted to adjust the position of said steel balls in the tapered inner diameter of said barrel.

5. The positioning structure as claimed in claim 4 wherein said adjustment member has an outwardly expanded head disposed outside said barrel for positioning.

* * * * *